US012505667B2

(12) United States Patent
Silva

(10) Patent No.: US 12,505,667 B2
(45) Date of Patent: Dec. 23, 2025

(54) OBSERVING CROP GROWTH THROUGH EMBEDDINGS

(71) Applicant: Deere & Company, Moline, IL (US)

(72) Inventor: Daniel Ribeiro Silva, San Jose, CA (US)

(73) Assignee: Deere & Company, Moline, IL (US)

( * ) Notice: Subject to any disclaimer, the term of this patent is extended or adjusted under 35 U.S.C. 154(b) by 351 days.

(21) Appl. No.: 17/559,631

(22) Filed: Dec. 22, 2021

(65) Prior Publication Data

US 2023/0196762 A1   Jun. 22, 2023

(51) Int. Cl.
*G06V 20/10* (2022.01)
*G06V 10/764* (2022.01)

(52) U.S. Cl.
CPC .......... *G06V 20/188* (2022.01); *G06V 10/764* (2022.01)

(58) Field of Classification Search
CPC ...... G06V 20/188; G06V 10/82; G06V 20/68; G06V 10/143; G06V 10/751; G06V 10/757; G06V 10/764; G06V 10/84; G06V 20/20; G06V 10/25; G06V 10/255; G06V 10/74; G06V 10/7715; G06V 10/774; G06V 10/776; G06V 20/35; G06V 20/38; G06V 20/56; G06V 20/64; G06V 2201/10; G06V 30/194; G06T 2207/30188; G06T 2207/20081; G06T 2207/20084;

(Continued)

(56) References Cited

U.S. PATENT DOCUMENTS 5,897,619 A   4/1999 Hargrove et al.
9,652,840 B1 * 5/2017 Shriver ................. G06T 7/0004
(Continued)

FOREIGN PATENT DOCUMENTS

JP   2003006612   1/2003

OTHER PUBLICATIONS

Moon et al. "Prediction of the fruit development stage of sweet pepper (*Capsicum annum* var. *annuum*) by an ensemble model of convolutional and multilayer perceptron", Biosystems Engineering, vol. 210, pp. 171-180, https://doi.org/10.1016/j.biosystemseng.2021.08.017. (Year: 2021).*

(Continued)

*Primary Examiner* — Ian L Lemieux
(74) *Attorney, Agent, or Firm* — Fenwick & West LLP

(57) ABSTRACT

Implementations are described herein for reducing the time and costs associated with the collection and processing of information for observing and evaluating crop growth. In various implementations, a temporal sequence of images depicting a growth of a crop over a time interval may be processed using a machine learning model. Based on the processing, a crop trajectory of image embeddings may be generated that represent the growth of the crop over the time interval. The crop trajectory of image embeddings may be compared with one or more reference crop trajectories of image embeddings. Each of the one or more reference crop trajectories may include a plurality of image embeddings that represent growth of the same type of crop as the crop trajectory of image embeddings over a respective time interval. Data associated with the comparing may be provided as output.

20 Claims, 10 Drawing Sheets

(58) Field of Classification Search
CPC . G06T 2207/10032; G06T 2207/10024; G06T 2207/30242; G06T 7/001; G06T 11/00; G06T 11/60; G06T 13/60; G06T 17/00; G06T 2207/10016; G06T 2207/10021; G06T 2207/10028; G06T 2207/10036; G06T 2207/10048; G06T 2207/20212; G06T 2207/30252; G06T 7/0002; G06T 7/0004; G06T 7/0016; G06T 7/10; G06T 7/20; G06T 7/33; G06T 7/70; G06T 7/74; G06T 7/85; G06T 7/90; G06T 7/97; G06N 20/00; G06N 3/042; G06N 3/044; G06N 3/0464; G06N 3/126; G06N 3/09; G06N 3/08; G06N 3/0442; A01G 22/00; A01G 7/00; A01B 79/005

See application file for complete search history.

(56) References Cited

U.S. PATENT DOCUMENTS

| | | | |
|---|---|---|---|
| 10,216,766 | B2 | 2/2019 | Lin et al. |
| 11,508,092 | B2* | 11/2022 | Watson ............... G06T 7/97 |
| 11,803,959 | B2* | 10/2023 | Yang ............... G06N 3/084 |
| 2005/0192760 | A1 | 9/2005 | Dunlap |
| 2016/0148104 | A1* | 5/2016 | Itzhaky ............... G06N 3/08 706/12 |
| 2017/0251589 | A1 | 9/2017 | Tippery et al. |
| 2018/0025480 | A1 | 1/2018 | Dingle et al. |
| 2018/0137357 | A1 | 5/2018 | Margalit et al. |
| 2018/0189564 | A1 | 7/2018 | Freitag et al. |
| 2018/0211156 | A1 | 7/2018 | Guan et al. |
| 2018/0293671 | A1 | 10/2018 | Murr et al. |
| 2018/0308229 | A1 | 10/2018 | Winkler et al. |
| 2019/0156106 | A1* | 5/2019 | Schroff ............... G06N 3/045 |
| 2020/0250531 | A1* | 8/2020 | Rai ............... G06N 3/044 |
| 2021/0007287 | A1* | 1/2021 | Alexander ............... G06T 7/0012 |
| 2021/0183108 | A1* | 6/2021 | Watson ............... G06T 7/97 |
| 2021/0406539 | A1* | 12/2021 | Lo ............... G06V 20/20 |
| 2022/0007589 | A1* | 1/2022 | Binney ............... G06T 7/0012 |
| 2022/0304257 | A1* | 9/2022 | Hiromitsu ............... G06T 7/0012 |
| 2022/0338421 | A1* | 10/2022 | Call ............... A01G 7/06 |
| 2022/0358265 | A1* | 11/2022 | Wang ............... G06F 30/27 |
| 2023/0028706 | A1* | 1/2023 | Watson ............... G06Q 10/04 |
| 2023/0100004 | A1* | 3/2023 | Brauer ............... G06V 20/188 382/110 |
| 2023/0196754 | A1* | 6/2023 | Silva ............... G06V 10/751 382/190 |
| 2023/0354795 | A1* | 11/2023 | Aronov ............... A01N 63/14 |
| 2023/0359829 | A1* | 11/2023 | Yuan ............... G06N 3/0455 |
| 2023/0360189 | A1* | 11/2023 | Gao ............... A01G 7/00 |

OTHER PUBLICATIONS

Xu et al. "DeepCropMapping: A multi-temporal deep learning approach with improved spatial generalizability for dynamic corn and soybean mapping", Remote Sensing of Environment, vol. 247, https://doi.org/10.1016/j.rse.2020.111946. (Year: 2020).*

Chen et al., "The HTPmod Shiny application enables modeling and visualization of large-scale biological data" Communications Biology. 2018. DOI:10.1038/s42003-018-0091-x. www.nature.com/commsbio. 8 pages.

Yasrab et al., "Predicting Plant Growth from Time-Series Data Using Deep Learning" Remote Sens. 2021, 13, 331. https://doi.org/10.3390/rs13030331. 17 pages.

Van Der Maaten et al., "Visualizing Data using t-SNE" Journal of Machine Learning Research 9 (2008) 2479-2605. 27 pages.

Lee, W.S.; Citrus Yield Mapping System in Natural Outdoor Scenes using the Watershed Transform; dated Jul. 2006.

Calafell, Davinia; Application of image processing methodologies for fruit detection and analysis; Universitat de Lleida; 86 pages; dated Jul. 2014.

Climate Fieldview—Yield Analysis; Video retrieved from https://www.youtube.com/watch?v=G6M-YGolxeA; dated Nov. 1, 2017.

Google Glass—New Tool for Ag; Video retrieved from https://www.youtube.com/watch?v=drypBC4bzLg; dated Oct. 31, 2014.

Grassi, Mathew; Google Glass: New Tool For Ag; retrieved from https://www.croplife.com/precision/google-glass-new-tool-or-toy-for-ag/; dated Oct. 8, 2014.

Klompenburg, Thomas et al.; Crop yield prediction using machine learning: A systematic literature review; Computers and Electronics in Agriculture; 18 pages; dated 2020.

Ubbens, J. et al., "Latent Space Phenotyping: Automatic Image-Based Phenotyping for Treatment Studies"; AAAS Plant Phenomics, vol. 2020; Retrieved from Internet: URL:https://downloads.spj.sciencemag.org/plantphenomics/2020/5801869.pdf, 13 pages; dated Jan. 20, 2020.

Samiei, S. et al., "Deep Learning-Based Detection of Seedling Development"; Plant Methods, vol. 16; retrieved from Internet: URL:https://link.springer.com/article/10.1186/s13007-020-00647-9/fulltext.html; 11 pages; dated Jul. 30, 2020.

Desai, S.V. et al., Automatic estimation of heading date of paddy rice using deep learning; arXiv.org, Cornell University Library; arXiv:1906.07917v1; 16 pages; dated Jun. 19, 2019.

European Patent Office; International Search Report and Written Opinion issued in Application PCT/US2022/050739; 11 pages; dated Feb. 24, 2023.

* cited by examiner

Processing a temporal sequence of images that depict a growth of a crop over a time interval
801

Based on the processing, generating a crop trajectory of image embeddings
803

Comparing the crop trajectory of image embeddings with one or more reference crop trajectories
805

Causing data associated with the comparing to be provided as output
807

FIG. 8

Processing a temporal sequence of images depicting a growth of a crop over a time interval
901

Based on the processing, generating a crop trajectory of image embeddings
903

Accessing one or more reference crop trajectories of image embeddings
905

Causing a display to simultaneously render the crop trajectory of image embeddings and one or more of the reference crop trajectories
907

FIG. 9

OBSERVING CROP GROWTH THROUGH EMBEDDINGS

BACKGROUND

An agriculture system often includes various types of crops to reduce risks associated with soil health and food nutrition. Studies on the growth of the crops are essential to help farmers and scientists to understand and address issues such as pests, weeds, diseases, and fertilizers, for ensuring a healthy growth of the crops. However, due to the complexity of the agriculture system, farmers sometimes find it difficult to collect representative information to track and characterize the growth of the crops and their interactions with the environment. Moreover, for a well-diversified and large-scale agricultural system, farmers may also find it overwhelming to sort through a large amount of information to evaluate the growth of the crops.

SUMMARY

Implementations are described herein for reducing the time and costs associated with the collection and processing of information for observing and evaluating crop growth on different stages (e.g., early-stage, mid-stage, and late-stage). In some implementations, images of crops may be collected over time to form temporal sequences of images. The temporal sequences of images, which depict the growth of crops over time, may be processed using a machine learning model to create crop trajectories of semantically-rich image embeddings. For example, a crop trajectory of a strawberry plant may include a plurality of image embeddings that were generated from, and therefore correspond to, a temporal sequence of images collected from the strawberry plant. The individual image embeddings in the crop trajectory may represent (e.g., encode) crop attributes at different stages of growth in a lower-dimensional space than the original images themselves. Such crop trajectory may enable users such as crop growers to not only understand a current stage of a given crop, but also identify and analyze deviations from an expected growth trajectory of the crop. Analysis of these deviations may facilitate generation of a variety of agricultural conclusions, including but not limited to diagnosis of various maladies, such as disease, pest infestation, dehydration, overhydration, suboptimal nutrients, suboptimal climate conditions, etc.

In some implementations, a method may be implemented using one or more processors and may include: processing a temporal sequence of images depicting a growth of a crop over a time interval using a machine learning model; based on the processing, generating a crop trajectory of image embeddings that represent the growth of the crop over the time interval; comparing the crop trajectory of image embeddings with one or more reference crop trajectories of image embeddings, each of the one or more reference crop trajectories including a plurality of image embeddings that represent growth of the same type of crop as the crop trajectory of image embeddings over a respective time interval; and causing data associated with the comparing to be provided as output.

In some implementations, the comparing may include: identifying a deviation of the crop trajectory of image embeddings from one or more of the reference crop trajectories. Optionally, the comparing may include: performing regression analysis on the crop trajectory of image embeddings and one or more of the reference crop trajectories. In some implementations, the causing may include: causing a display to simultaneously render the crop trajectory of image embeddings and one or more of the reference crop trajectories. In some implementations, causing the display to simultaneously render the trajectories includes implementing the t-distributed stochastic neighbor embedding (t-SNE) technique to render the trajectories in two or three dimensions.

In some implementations, the method may further include: generating one or more phenotypic conclusions about the growth of the crop based on the comparing, where the data associated with the comparing includes the one or more phenotypic conclusions. The generating may include: applying a classifier machine learning model to the crop trajectory of image embeddings, wherein the classifier machine learning model is trained based at least in part based on the one or more reference trajectories. The classifier machine learning model comprises, for example, a recurrent neural network.

In some implementations, a method may be implemented using one or more processors and may include: processing a temporal sequence of images depicting a growth of a crop over a time interval using a machine learning model; based on the processing, generating a crop trajectory of image embeddings that represent the growth of the crop over the time interval; accessing one or more reference crop trajectories of image embeddings, each of the one or more reference crop trajectories including a plurality of image embeddings that represent growth of the same type of crop as the crop trajectory of image embeddings over a respective time interval; and causing a display to simultaneously render the crop trajectory of image embeddings and one or more of the reference crop trajectories using the t-distributed stochastic neighbor embedding (t-SNE) technique. The method may further include generating one or more phenotypic conclusions about the growth of the crop based on the comparing, wherein the data associated with the comparing includes the one or more phenotypic conclusions.

In some implementations, the comparing includes identifying a deviation of the crop trajectory of image embeddings from one or more of the reference crop trajectories. Optionally, the comparing includes performing regression analysis on the crop trajectory of image embeddings and one or more of the reference crop trajectories. The causing includes: causing the display to simultaneously render the trajectories includes implementing the t-distributed stochastic neighbor embedding (t-SNE) technique to render the trajectories in two or three dimensions. The generating of one or more phenotypic conclusions may include applying a classifier machine learning model to the crop trajectory of image embeddings, wherein the classifier machine learning model is trained based at least in part based on the one or more reference trajectories. The classifier machine learning model may include a recurrent neural network.

In some implementations, a system may include one or more processors and memory storing instructions that, in response to execution of the instructions, cause the one or more processors to: process a temporal sequence of images depicting a growth of a crop over a time interval using a machine learning model; based on the processing, generate a crop trajectory of image embeddings that represent the growth of the crop over the time interval; compare the crop trajectory of image embeddings with one or more reference crop trajectories of image embeddings, each of the one or more reference crop trajectories including a plurality of image embeddings that represent growth of the same type of crop as the crop trajectory of image embeddings over a respective time interval; and cause data associated with the comparing to be provided as output.

In some implementations, the instructions include instructions to identify a deviation of the crop trajectory of image embeddings from one or more of the reference crop trajectories. The instructions may include instructions to cause a display to simultaneously render the crop trajectory of image embeddings and one or more of the reference crop trajectories. The instructions may also include instructions to implement the t-distributed stochastic neighbor embedding (t-SNE) technique to render the trajectories in two or three dimensions. The instructions may also include instructions to generate one or more phenotypic conclusions about the growth of the crop based on the comparing, wherein the data associated with the comparing includes the one or more phenotypic conclusions.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Yet other implementations include agricultural vehicles, such as robots, that are equipped with edge processor(s) configured to carry out selected aspects of the present disclosure.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 8 illustrates an example method for generating and comparing crop trajectories of image embeddings, for practicing certain aspects of the present disclosure, in accordance with various implementations.

FIG. 9 illustrates another example method for generating and displaying a crop trajectory of image embeddings, for practicing certain aspects of the present disclosure, in accordance with various implementations.

DETAILED DESCRIPTION

Figure 1:
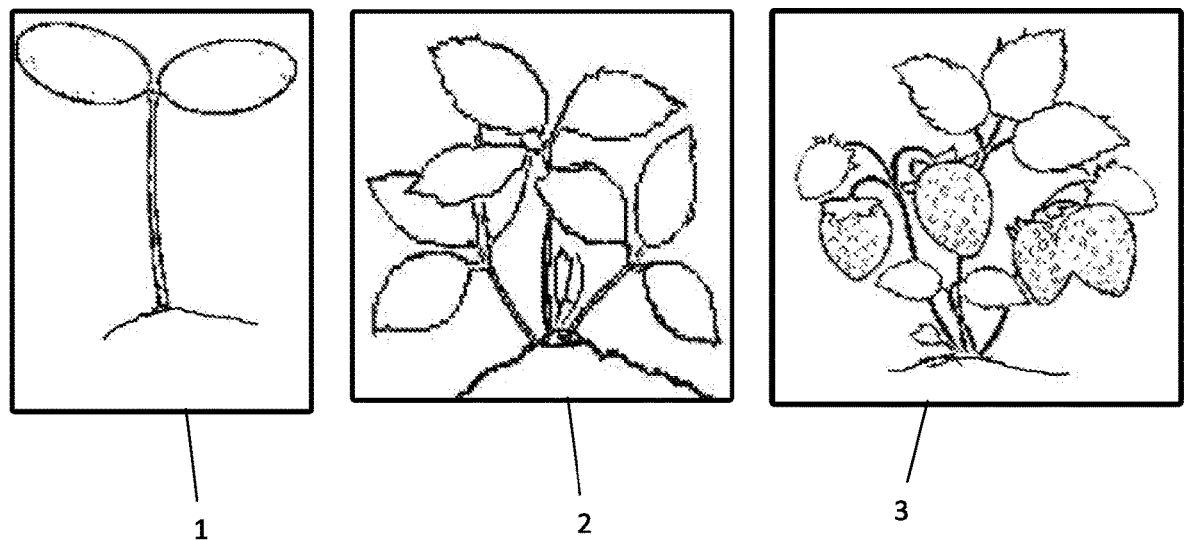
FIG. 1 illustrates different growth stages of a strawberry plant.

For strawberries and other similar crops, there is considerable risk associated with producing too much or not enough fruit. If a farmer's crop yield fails to satisfy a request from a distributor, the farmer may be forced to purchase fruit elsewhere at a premium in order to satisfy the farmer's obligation. If the farmer's crop yield exceeds the farmer's obligation, the farmer may be forced to waste fruit and/or sell excess fruit as a substantial discount. Moreover, farmers are often required to pre-hire workers to pick everbearing crops such as strawberries, and hiring the correct number of workers may be difficult if the farmers are unable to make timely and accurate crop yield predictions.

Implementations are described herein for reducing the time and costs associated with the collection and processing of information for observing and evaluating crop growth on different stages (e.g., early-stage, mid-stage, and late-stage). In some implementations, images of crops may be collected over time to form temporal sequences of images. The temporal sequences of images, which depict the growth of crops over time, may be processed using a machine learning model to create crop trajectories of semantically-rich image embeddings. For example, a crop trajectory of a strawberry plant may include a plurality of image embeddings that were generated from, and therefore correspond to, a temporal sequence of images collected from the strawberry plant. The individual image embeddings in the crop trajectory may represent (e.g., encode) crop attributes at different stages of growth in a lower-dimensional space than the original images themselves. Such crop trajectory may enable users such as crop growers to not only understand a current stage of a given crop, but also identify and analyze deviations from an expected growth trajectory of the crop. Analysis of these deviations may facilitate generation of a variety of agricultural conclusions, including but not limited to diagnosis of various maladies, such as disease, pest infestation, dehydration, overhydration, suboptimal nutrients, suboptimal climate conditions, etc.

In some implementations, crop-depicting images may be collected by vision sensor(s) that are transported over/ through a field of different crops or plants. These vision sensor(s) may be transported in various ways, such as via a robot, rover, or unmanned aerial vehicle (UAV) equipped with the vision sensor(s), or as standalone modular sensor packages that can be mounted to agricultural vehicles such as tractors or center pivots, or that can be carried by agricultural personnel.

In some implementations, an image of a given crop is captured and visual features can be extracted from the image. In some implementations, the visual features may be extracted using a trained machine learning model, such as convolutional neural network (CNN), to output an N-dimensional image embedding that represents a current stage of the given crop. In this way, a high-resolution image with its dimensions on the order of millions or tens of millions may be reduced to an image embedding with considerably less dimensions, e.g., on the order of hundreds or thousands. Alternatively, or additionally, the output generated based on the trained machine learning model may include a classification of the given crop that is depicted in the image. Alternatively or additionally, the trained machine learning model may include a softmax or other similar operation to output a probability for each possible classification, out of a given number of classifications, to which the given crop belongs.

To understand the full crop journey representing the full growth of the given crop, a temporal sequence of images may be collected over time for the given crop. The temporal sequence of images can be processed as described above to produce a corresponding temporal sequence of image embeddings in a common N-dimensional (e.g., 128) space. Further, for purpose of validation by human eyes, the temporal sequence of N-dimensional (e.g., 128) image embeddings or a portion thereof may be visualized by applying techniques such as t-distributed stochastic neighbor embedding (t-SNE) or Principal Component Analysis (PCA) to reduce one or more N-dimensional image embeddings into one or more three-dimensional (3D) or two-dimensional (2D) image embeddings that can be displayed to a user.

For example, a first plurality of images may be captured for a strawberry plant during an early growth stage of the strawberry plant. The first plurality of images may be processed to generate a first crop trajectory portion corresponding to the early growth stage of the strawberry plant in the common N-dimensional coordinate system (usually a 128-dimensional embedding space, for example). The first crop trajectory portion may be visualized with a reduced dimension (e.g., 3D) for display to the user for quick evaluation. A second plurality of images of the strawberry plant may be collected during a middle growth stage of the strawberry plant. The second plurality of images may be processed to show a second crop trajectory portion corresponding to the middle growth stage of the strawberry plant in the N-dimensional coordinate system. The second crop trajectory portion may be visualized and displayed to the user in the 2D or 3D coordinate system for quick evaluation by the user. A third plurality of images of the strawberry plant may be collected during a late growth stage of the strawberry plant. The third plurality of images may be processed to show a third crop trajectory portion corresponding to the late growth stage of the strawberry plant in the N-dimensional coordinate system. Optionally, the third crop trajectory portion may be visualized and displayed to the user in the 2D or 3D coordinate system for quick evaluation. In various implementations, the first, second, and third crop trajectory portions together present a full crop journey for the strawberry plant.

Crop trajectories for any number of types of crops may be generated, analyzed, and used as reference crop trajectories, etc. Such crop types can include, but are not limited to, the aforementioned strawberry, raspberry, sugarbeet, corn, wheat, and soybeans, to name a few. With a sufficient number of images captured from different crops at different stages, specific trajectories for different crops can be presented to users interested in analyzing or evaluating the growth of crops in a particular field. This can be helpful when users are faced with thousands, tens of thousands, or an even larger amount of images showing various growth stages of different crops. The user may also be able to select crops they are interested in studying from a crop journey database for presentation in a common coordinate system.

To train the machine learning models to produce crop trajectories/journeys, a vision sensor may generate training instances by capturing images of crops with known growth trajectories throughout their crop cycles. In various implementations, these captured images may be labeled based on ground truth data about those crops' growth trajectories. For example, images of crops that remain healthy throughout their life cycle and produce acceptable or optimal crop yields may be used to generate training embeddings and/or trajectories of training embeddings that are labeled as such. Similarly, Images of crops that experience disease and therefore produce suboptimal yields may be used to generate training embeddings and/or trajectories of training embeddings that are labeled as such.

Deviations of crop trajectories from reference crop trajectories may be performed manually by visually comparing the trajectories, or automatically with an alert sent to the party interested in the detection results. In the former case, techniques such as t-distributed stochastic neighbor embedding (t-SNE) may be applied to visualize the image embeddings in a 2D or 3D space. In the 2D or 3D space, the image embeddings associated with each crop at their different stages may form visual trajectories, which can be reviewed manually for anomaly detection (e.g., dehydration or overhydration, disease, pest infestation, nutrient deficiency, etc.). In the latter case of automatic deviation detection, the trajectories may be compared in various ways, such as with regression analysis, machine learning classifiers, time-series machine learning models, etc.

FIG. 1 illustrates a sequence of growth stages for a plant, i.e., a strawberry plant that grows individually or in a field. As depicted in FIG. 1, the strawberry plant may have different growth stages, including an early growth stage (e.g., sprout), a middle growth stage (e.g., plant without fruit), and a late growth stage (e.g., plant with fruit). For the depicted strawberry plant, a plurality of images may be collected, for example, using one or more vision sensors of an agricultural robot, or of a modular computing device/sensor package, etc. The plurality of images may include a first image 1 depicting the early growth stage of the strawberry plant, a second image 2 depicting the middle growth stage of the strawberry plant, and a third image 3 depicting the late growth stage of the strawberry plant.

In various implementations, the first image 1, the second image 2, and the third image 3 may be transmitted to a computing device, via one or more networks, for image processing. The network(s) may be local or wide area networks (e.g., the Internet), or personal area networks. The field can vary in its size and diversity and include a number of strawberry plants, in which case, images of each strawberry plant may be captured and processed to evaluate their growth. The field can include other types of crops or plants that are companion plants that interact well with primary crops (e.g., the strawberry plants). This strategy of companion planting is commonly used to enhance soil conditions, control pests, and attract beneficial pollinators. It's noted that the field may grow other types of crops or plants without strawberry plants. As a non-limiting example, the field may include agricultural areas for growing raspberry plants, sugarbeet, corn, wheat, and/or soybeans, with their respective companion plants.

Figure 2:
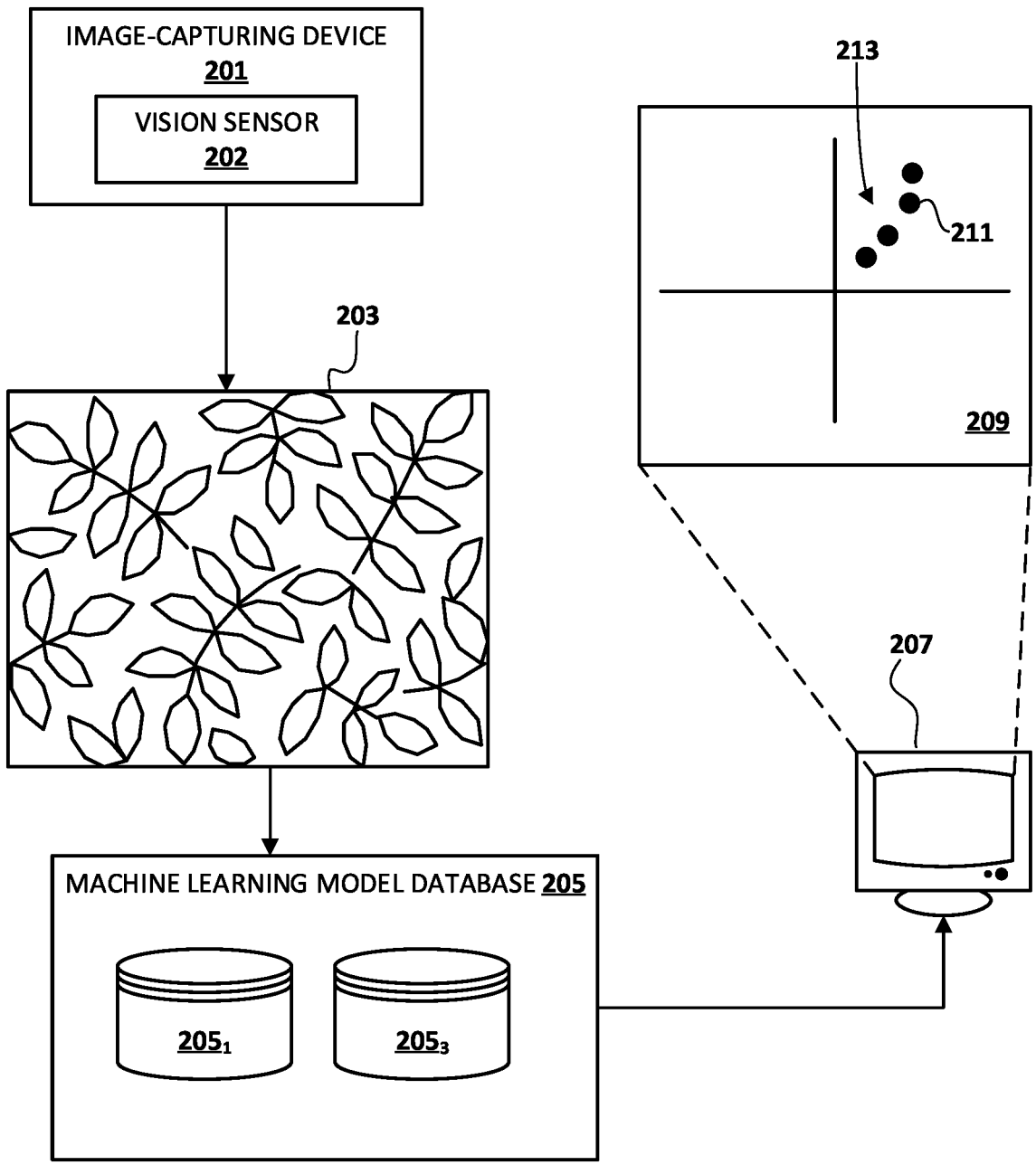
FIG. 2 illustrates an example system for generating an imaging embedding for practicing certain aspects of the present disclosure, in accordance with various implementations.

FIG. 2 illustrates an example system for practicing certain aspects of the present disclosure, in accordance with various implementations. As shown in FIG. 2, the system includes an image-capturing device 201, a machine learning model database 205, and a display 207. The image-capturing device 201 may include one or more vision sensors 202 for capturing one or more static images, or one or more dynamic images that respectively represents a time-series of static images. For example, as shown in FIG. 2, the image-capturing device 201 may capture a two-dimensional, crop-depicting, digital image 203. The image 203 may depict a single plant, multiple plants of the same type, or multiple plants of different types. The image-capturing device 201 may be integrated with or otherwise mounted on a robot, rover, or unmanned aerial vehicle (UAV), or mounted on agricultural vehicles such as tractors or center pivots, for automatically collecting images of plants in the crop field. The image-capturing device 201 may also be individually carried by a user to manually collect images of one or more plants. The image-capturing device 201 may take various forms, such as an RGB camera, a stereoscopic camera, other types of cameras with or without depth capabilities, cameras that operate in wavelengths other than RGB (e.g., X-ray, infrared, etc.), and so forth.

In some implementations, the image-capturing device 201 may be configured to time stamp each image it collects, and transmit the time-stamped images to a computing system (e.g., a remote server), along with other metadata such as identification data (e.g., crop ID, crop name, crop age, field ID) and environmental data (e.g., temperature, humidity, weather, and GPS coordinates), for further processing. The environmental data may be collected, time-stamped, and/or transmitted by one or more additional sensors (not depicted) that are included with the image-capturing device 201 or with the robot (or, rover, UAV) that carries the image-capturing device 201. In some implementations, the image-capturing device 201 (or a computing device connected to it) may be configured to detect image blur, filter out blurred images, and retake images, before transmitting the collected images for further processing. Additionally or alternatively, the image-capturing device 201 (or a computing device connected to it) may be configured to correct the blurred images before transmitting a whole batch of collected images for further processing. In some other implementations, the image-capturing device 201 (or a computing device connected to it) may remove duplicated images or unwanted images (e.g., an image that depicts no crops/plants) before transmitting the collected images for further processing.

The machine learning model database 205 includes one or more trained machine learning models, such as a machine learning model $205_1$ and a machine learning model $205_3$, for processing the crop-depicting image 203 captured by the image-capturing device 201 and/or the aforementioned metadata. For example, the machine learning model $205_1$ may be trained to process an array of pixel values (including, for example, intensity and RGB values) of the crop-depicting image 203. Output may be generated in the form of a reduced-dimensionality, and yet semantically rich, image embedding, which may be used for a variety of purposes, such as for detection, classification, and/or segmentation of crops. The image embedding may be a reduced-dimensionality vector which is, for example, on the order of tens or hundreds.

In some implementations, the t-distributed stochastic neighbor embedding (t-SNE) method may be applied to visualize, via a user interface of the display 207, the image embedding in a 2D or 3D space. The display 207 may be a liquid crystal display, a flexible display, an organic light-emitting display, or any other type of display. The crop-depicting image 203 may be visualized as a 2D image embedding 211 in a 2D coordinate system 209 at a user interface of the display 207, or be visualized (e.g., augmented) as a 3D image embedding (not shown) in a 3D coordinate system (not shown). In some implementations, the t-SNE may visualize a plurality of image embeddings 211 in the 2D coordinate system 209, and when the plurality of crop-depicting images 203 (from which the plurality of image embeddings are obtained) are time-related, the plurality of the 2D image embeddings 211 forms a crop trajectory for the crop depicted in the images 203. To reduce the computational burden of the system 200, the crop-depicting image 203 may be pre-processed to extract an image representation of the crop, before being processed by one or more trained machine learning models in the machine learning model database 205.

In some implementations, the crop-depicting image 203 may have a large number of dimensions, which may include irrelevant information such as noise, visual elements surrounding the plant, etc. For example, a crop-depicting image may be a color image having 2048×2592 (=5,308,416) pixels, which correspond to 15,925,248 dimensions. Some of the pixels of the color image may, for example, describe a butterfly or other insect that happens to fly around the plant when the image is captured, and thus provide information irrelevant to the plant or its health condition. While high-resolution, colored images in large dimensions like this may be desirable for various purposes, such as for purposes of analyzing crop trajectories described herein, they may not be optimal.

Accordingly, the crop-depicting image 203 (e.g., with 15,925,248 dimensions) may be processed using the machine learning model $205_1$ to produce an image embedding with considerably less dimensions, e.g., on the order of hundreds or thousands. In some implementations, the machine learning model $205_1$ is a CNN that is trained such that it can be used to process the crop-depicting image 203 to extract visual features of a crop in the crop-depicting image 203. Based on this processing, an N-dimensional embedding may be generated that represents a current stage of the crop. In some implementations, the machine learning model $205_1$ (e.g., CNN) may be trained to alternatively, or additionally, output a classification of the crop, out of a given number of classifications, to which the crop belongs. For example, the trained CNN may process the crop-depicting image 203 to classify that the crop described in the crop-depicting image 203 is a corn, out of a given number of classifications including mint, corn, cucumber, and pole beans that are grown in the same field. Optionally, the trained CNN may include a softmax operation to output a probability for each classification, out of the given number of classifications, to which the given crop belongs, where the sum of the probabilities is equal to 1. For example, given four crops (mint, corn, cucumber, and pole beans) are grown in the same field, the trained CNN may receive the crop-depicting image 203 and predict that the crop depicted in the crop-depicting image 203 has a first probability of approximately 95% to be corn, a second probability of approximately 5% to be pole beans, and a third/fourth probability of approximately 0% for the mint and cucumber, respectively.

In some implementations, the machine learning model $205_3$ may be a time-series or incremental model such as a recurrent neural network (RNN). Such a RNN may be trained, for instance, to detect deviations of a plant's growth from an expected growth trajectory, and/or to diagnose such a detected deviation into one of any number of causes (e.g., diseases, pest infestations, over- or under-hydration, etc. Thus, in addition to or instead of the user visually analyzing deviations from an expected growth trajectory, these deviations can be detected (and reported to the user) automatically.

For example, machine learning model $205_3$ may be trained to generate, at each of a plurality of increments, output that predicts a next image embedding at a next increment and/or infers a cause behind any deviation from an expected growth trajectory. For example, the trained machine learning model $205_3$ may receive and process a temporal sequence of images that depict a strawberry plant at day 10, 20, and 30, to predict an image embedding for the strawberry plant at day 40. In this example, at a first increment, the trained machine learning model $205_3$ may process the first image in the temporal sequence that depicts the strawberry plant at day 10, using one or more first weights, to generate a first hidden state. It's noted that one or more of the first weights can be different from each other and be expressed as an input-to-hidden matrix for processing the first image to obtain the first hidden state. Optionally, based on the first hidden state and one or more second weights, the trained machine learning model $205_3$ may predict and output an image embedding of the strawberry plant at day 20. It's noted that one or more of the second weights can be different from each other and be expressed as a hidden-to-output matrix for processing the first hidden state to obtain the first image embedding.

At a second increment, the trained machine learning model $205_3$ may process the first hidden state using one or more third weights, the second image in the temporal sequence that depicts the strawberry plant at day 20 using the one or more first weights, to generate a second hidden state. It's noted that one or more of the third weights can be different from each other and be expressed as a hidden-to-hidden matrix. Optionally, based on the second hidden state and the one or more second weights, the trained machine learning model $205_3$ may predict and output an image embedding for the strawberry plant at day 30. At a third increment, the trained machine learning model $205_3$ may process the second hidden state with one or more third weights and process the third image in the temporal sequence that depicts the strawberry plant at day 20 with the one or more first weights, to generate a third hidden state Based on the third hidden state and the one or more second weights, the trained machine learning model $205_5$ may predict and output an image embedding for the strawberry plant at day 40. Alternatively or additionally, the trained machine learning model $205_3$ may determine whether a predicted image embedding for the strawberry plant deviates from an expected growth trajectory or not. Alternatively or additionally, the trained machine learning model $205_3$ may detect or infer a cause behind any deviation from the expected growth trajectory.

In some implementations, a method for training the machine learning model $205_3$ can include: generating a plurality of training instances to train a machine learning model (e.g., RNN), where each training instance include (1) a temporal sequence of crop-depicting images that respectively depicts a same crop at its different ages (e.g., a number of N different ages, where N is an integral greater than or equal to 2), as training input; and (2) a label describing a feature associated with a crop, as a ground truth label. The label, for example, can be a health condition of the crop at an age subsequent to the different ages of the crop. The method can further include: for each training instance, (3) applying the temporal sequence of crop-depicting images as training input to the machine learning model to generate a predicted output for the crop at the age subsequent to the different ages, and (4) comparing the predicted output with the ground truth label to update one or more weights of the machine learning model. It's noted that, when training the machine learning model $205_1$ (e.g., CNN), the method can include steps similar to the aforementioned steps (1)~(4), except where instead of a temporal sequence of crop-depicting images, each training instance includes a crop-depicting image depicting a crop as training input.

As a non-limiting example, a training instance includes a temporal sequence of crop-depicting images of the crop (captured at $T_1, T_2, \ldots T_n$ respectively, where T represent a specific date and/or time, and n is an integral greater than or equal to 2), and is used to train the machine learning model 205; to predict a cause for deviation from an expected growth trajectory of the crop. The training instance may include a ground truth label, expressed as a 1×N matrix. For example, the ground truth label may be a 1×5 matrix ("M1"), where the columns N represent five individual reasons or causes (e.g., overhydration, dehydration, leaf disease, insect, unknown companion plant) for causing the crop in an abnormal condition at $T_{n+1}$ and the row represents the observation date and/or time of crop (i.e., $T_{n+1}$). The ground truth label may be matrix M1: [0 1 0 0 0], meaning given a first, second, third, fourth, and fifth reason for the crop being in an abnormal condition at $T_{n+1}$, the actual reason causing the abnormal condition of the crop is the second reason (e.g., dehydration, noting that the probability "1" ranks second in the row of matrix M1).

The temporal sequence of crop-depicting images of the crop (captured at $T_1, T_2, \ldots T_n$, respectively) can then feed, as input, into the machine learning model under training (e.g., RNN) to output a predicted output which, in this case, can be another 1×5 matrix ("M2"): [0.13 0.79 0.08 0 0]. The predicted output may for example, as seen in matrix M2, include a plurality of predicted probabilities, where each predicted probability represents a predicted likeliness of a corresponding reason for causing the abnormality of the crop at $T_{n+1}$ that is subsequent to $T_1$~$T_n$. For example, the matrix M2 can mean that, at $T_{n-1}$, the predicted probability for the first reason to cause the abnormal condition of the crop is 0.13, the predicted probability for the second reason to cause the abnormal condition of the crop is 0.79, the predicted probability for the third reason to cause the abnormal condition of the crop is 0.08, and the predicted probabilities for the fourth and fifth reasons to cause the abnormal condition of the crop are both 0. Based on the difference between the predicted output (i.e., matrix M2: [0.13 0.79 0.08 0 0]) and the ground truth label (i.e., matrix M1: [0 1 0 0 0]), the machine learning model can be adjusted, namely, one or more weights of the machine learning model are adjusted.

In some implementations, a training instance may include a temporal sequence of crop-depicting images of the crop (captured at $T_1, T_2, \ldots T_n$ respectively), and is used to train a machine learning model in the machine learning model database (e.g., another RNN than $205_3$) to predict a condition of the crop. For example, the training instance can further include a ground truth label, expressed as an m×n matrix, where m represents the number of dates (or time) respectively on which the condition/growth stage of the crop is predicted using the machine learning model under training, and n represents the given number of possible conditions of the crop. As an exemplary implementation and for purpose of illustration, the ground truth label may be a 2×3 matrix ("L1"), where the three columns represent three individual conditions (e.g., full leaves, blooming, fruit) of the crop and the rows represent two observation dates: D1 and D2 (subsequent to $T_1$~$T_n$) on which the condition of the crop is predicted by the machine learning model. The ground truth label may be matrix L1:

$$\begin{bmatrix} 0 & 1 & 0 \\ 0 & 0 & 1 \end{bmatrix},$$

meaning, for example, the actual condition ("ground truth condition") for the crop on the first subsequent observation date D1 is the second condition (e.g., blooming), and the actual condition of the crop on the second subsequent observation date D2 is the third condition (e.g., fruit).

In this example, when a temporal sequence of crop-depicting images of the crop is fed, as input, into the machine learning model under training, the model may generate a predicted $$\begin{bmatrix} 0.1 & 0.8 & 0.1 \\ 0 & 0.1 & 0.9 \end{bmatrix}.$$

output, which, for example, can be another 2×3 matrix ("L2"): The predicted output may have a plurality of predicted probabilities, including: (1) a plurality of first predicted probabilities each representing a predicted likeliness of a condition/growth stage of the crop on D1 (i.e., the first subsequent observation date following. In at which time the last crop-depicting image in the temporal sequence is captured); (2) a plurality of second predicted probabilities each representing a predicted likeliness of a condition of the crop on D2 (i.e., the second subsequent observation date following $T_n$). The first row in matrix L2 can mean that, on D1: the predicted probability for the crop being in the first condition (e.g., full leaves) is 0.1, the predicted probability for the crop being in the second condition (e.g., blooming) is 0.8, and the predicted probability for the crop being in the third condition (e.g., fruit) is 0.1. The second row in matrix L2 can mean that, on D2: the predicted probability for the crop being in the first condition is 0, the predicted probability for the crop being in the second condition is 0.1, and the predicted probability for the crop being in the third condition is 0.9. Based on the difference between the predicted output (e.g., matrix L2;

$$\begin{bmatrix} 0.1 & 0.8 & 0.1 \\ 0 & 0.1 & 0.9 \end{bmatrix}$$

and the ground truth label (e.g., L1:

$$\begin{bmatrix} 0 & 1 & 0 \\ 0 & 0 & 1 \end{bmatrix}),$$

the machine learning model can be adjusted before being validated and/or tested for normal use. In other words, one or more weights of the machine learning model are adjusted for better performance, such as enhanced prediction accuracy.

In some implementations, a large number of crop-depicting images (e.g., 50,000 images) may be applied to train one or more of the aforementioned machine learning models, and an additional number of crop-depicting images (e.g. 10,000 images) may be applied to validate the trained machine learning model before applying it to process either a single crop-depicting image, multiple crop-depicting images, or a temporal sequence of crop-depicting images.

The trained and/or validated machine learning model can be used to process one or more crop-depicting images to generate output in the form of one or more image embeddings. Additionally or alternatively, the trained and validated machine learning model may be used to generate a plurality of predicted probabilities, and based on the predicted probabilities, generate an agricultural conclusion or estimation. The agricultural conclusion may include one or more of the following: (1) an estimated target date (or date range) for a crop plant that has never bloom (or harvest) to bloom (or harvest); (2) an estimated target date for a crop plant to bloom or harvest again, for crops/plants like a strawberry plant which produce multiple yields in a year; (3) whether the crop is healthy or encounters one or more specific abnormal conditions (e.g., disease, pest infestation, dehydration, overhydration, suboptimal nutrients, etc.), or (4) whether the crop grows (or ripens) at a slower or faster rate than usual.

For example, a trained RNN can be used to predict a plurality of probabilities for the reasons that cause a crop to appear in an abnormal condition. Based on the plurality of predicted probabilities, the computing system in communication with the trained RNN can determine the most likely reason that causes the abnormality of the crop and the associated accuracy rate (i.e., the predicted probability having the highest value), and the second most likely reason that causes the abnormality of the crop and its associated accuracy rate (i.e., the predicted probability having the second highest value). If one of the predicted probabilities fails to exceed a threshold, the reason corresponding to such predicted probability is not considered a valid reason that causes the crop to appear abnormally. The most likely reason and/or the second most likely reason can be considered as valid reason(s) for presentation to the user if their corresponding predicted probability meets the threshold. For example, the computing system can generate an agricultural conclusion including the most likely reason (with or without its predicted probability), and optionally including the second most likely reason (with or without its predicted probability), for presentation to the user.

In some implementations, the distribution of the plurality of predicted probabilities may be quite even (i.e., the predicted probabilities are similar to each other, say there are five predicted probabilities output as: 0.21, 0.2, 0.19, 0.2, 0.2), and the computing system may determine that there is an error, high volume of noise (e.g., the image used for processing is blur or has low image quality), or an agricultural conclusion is unavailable. The computing system may notify the user accordingly, or request additional data for further analysis.

In some implementations, the computing system (e.g., a local or remote server) may send the agricultural conclusion to the user automatically. Additionally or alternatively, the user may be reminded with an alert and/or an alert message when accessing a user device that is in communication with one or more trained machine learning models in the machine learning model database. In some implementations, the alert message may have a text portion that includes the agricultural conclusion, and/or an image portion that includes the crop-depicting image (or the corresponding visualized image embedding, or both the crop-depicting image and its corresponding visualized image embedding).

Figure 5:
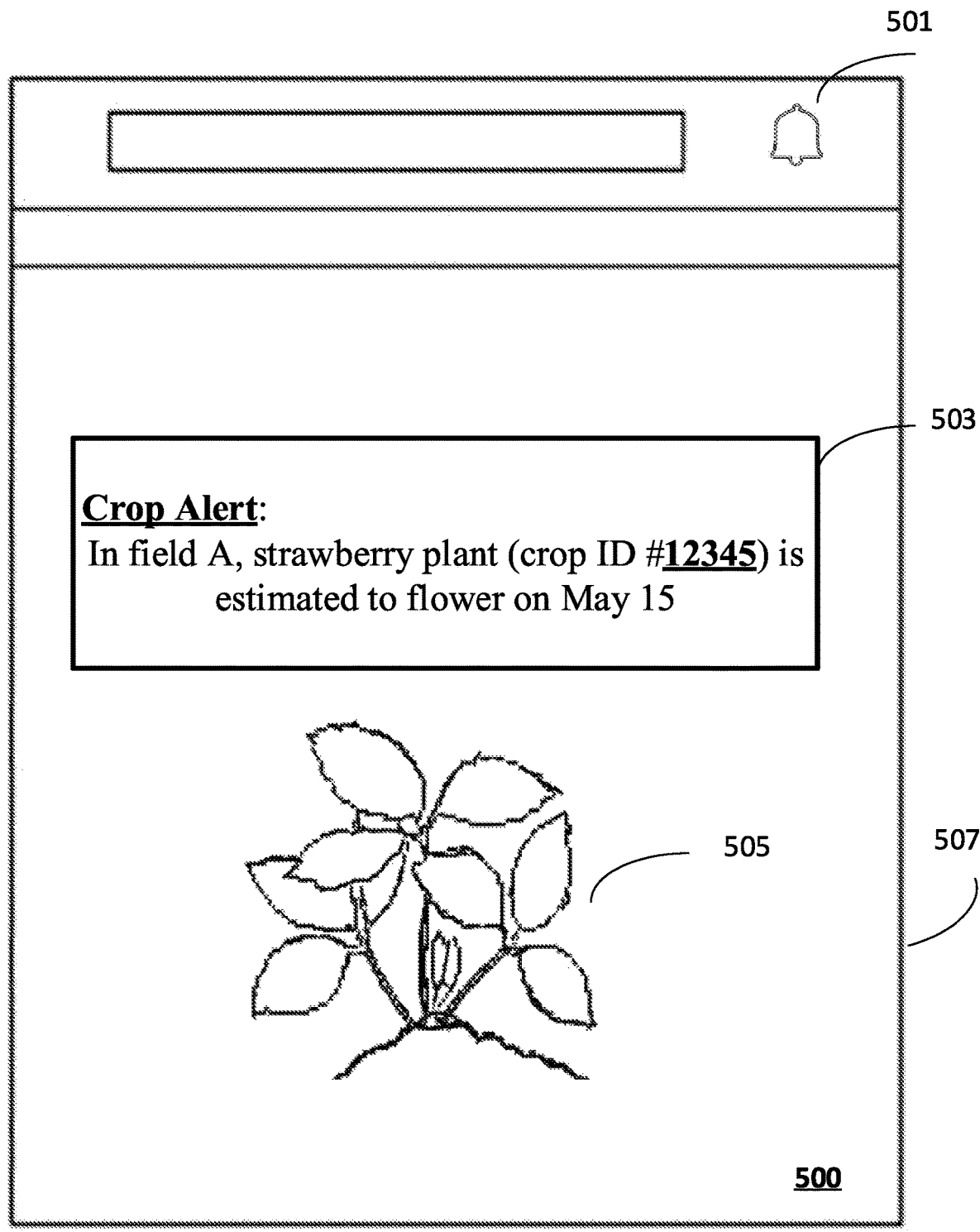
FIG. 5 illustrates an example alert message for practicing certain aspects of the present disclosure, in accordance with various implementations.

FIG. 5 illustrates an example alert message for practicing certain aspects of the present disclosure, in accordance with various implementations. As shown in FIG. 5, in response to receiving an agricultural conclusion obtained by using a machine learning model (e.g., CNN or RNN) to process one or more crop-depicting images, a user interface 507 of the user device 500 may display an alert icon 501 to alert the user that an agricultural conclusion regarding crop growth of a to-be-evaluated crop is ready to review. In some implementations, if the user clicks on the alert icon 501 (or a user input such as a voice input is received to trigger the alert icon 501, for example, via a voice assistant), an alert message 503 is displayed to provide the agricultural conclusion to the user. The alert message 503 may include, for example, the name of the crop for which the agricultural conclusion is generated, the ID of the crop (e.g., the 12345th strawberry plant in the field), the field ID (e.g., field A), and the agricultural conclusion (e.g., the estimated date for flowering). For example, referring to FIG. 5, the alert message 503 may be "Crop Alert: In field A, strawberry plant (crop ID #12345) is estimated to flower on May 15."

In some implementations, the alert message 503 may further include an estimated accuracy for the agricultural conclusion. For example, the alert message 503 may read as, "Crop Alert: In field A, strawberry plant (crop ID #12345) is estimated to flower on May 15. Accuracy 75%." As another example, instead of providing a specific estimated date for flowering, the alert message 503 may provide an estimated date range with an accumulated estimated accuracy, which reads, "Crop Alert: In field A, strawberry plant (crop ID #12345) is estimated to flower between May 14-16. Accuracy 92%." As a further example, the alert message 503 may provide an estimated target date with a first estimated accuracy as well as an estimated date range with a second estimated accuracy. In this case, the alert message 503 may read, for example, "Crop Alert: In field A, strawberry plant (crop ID #12345) is estimated to flower on May 15. Accuracy 75%. And, the probability to flower between May 13-17 is 92%."

In some implementations, the alert message 503 may read as, "Crop Alert: In field B, sugarbeet (crop ID #20012) is in a healthy condition." In this case, the alert message 503 includes the name of the crop for which the agricultural conclusion is generated (i.e., sugarbeet), the ID of the crop (i.e., #20012), the field ID (i.e., field B), and the agricultural conclusion (i.e., in a healthy condition). In some other implementations, the alert message 503 may read as, "Crop Alert: In field B, sugarbeet (crop ID #20012) is in an abnormal condition. 90% likely due to dehydration." That is, the agricultural conclusion not only includes the healthy condition of the sugarbeet (i.e., in an abnormal condition), but also includes the reason (i.e. dehydration) that causes the sugarbeet to be in the abnormal condition, as well as an estimated accuracy of the reason (i.e., 90%)

In some implementations, the alert message 503 may further include an image 505 depicting the crop (e.g., strawberry plant with crop ID #12345), for which an agricultural conclusion is generated. For example, the user may click a link associated with the specific value (e.g., "12345") of the crop ID to display the image 505, and the user may again click the link to hide the image 505 from the user interface 507. The image 505 may be the crop-depicting image that is processed by the machine learning model, or may be a characteristic image of the crop not used for processing by the machine learning model. The characteristic image of the crop may be retrieved from a local or online database, or may be obtained by searching the Internet. Optionally, the image 505 is selectable, and in response to receiving a user input (click or voice input), additional information for the crop may be displayed on the user interface 507, in addition to or replacing the image 505, along with the alert message 503; or the additional information may be displayed on a new user interface of the user device 500. The additional information may include the age of the crop, the current type of soil where the crop grows, the best type of soil suitable for growing the crop, the origin of the crop, the total number of crops in the same type within the same field, the blooming/harvest history, and any other relevant information the user may be interested in reviewing.

Figure 3:
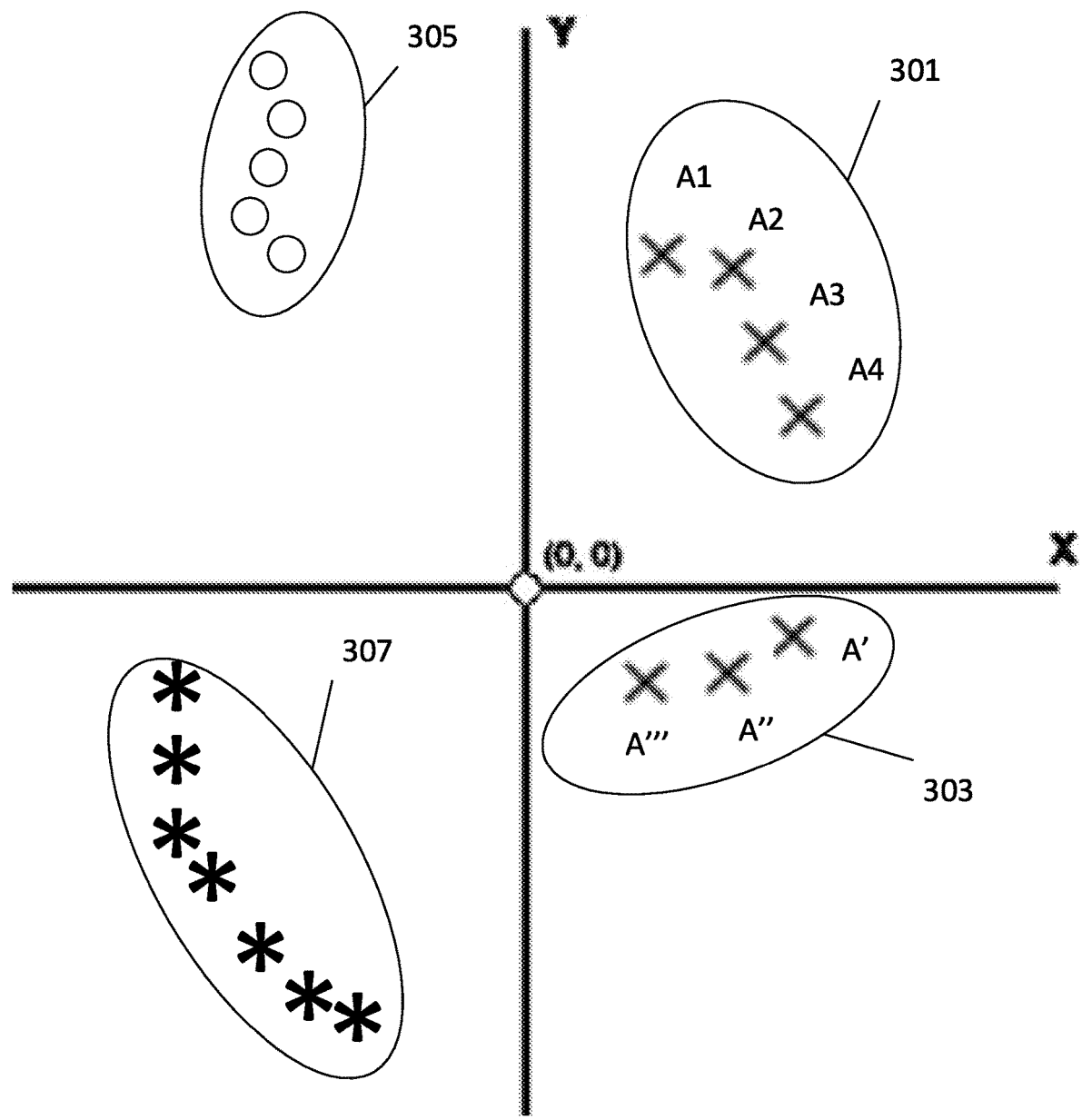
FIG. 3 illustrates example crop trajectories of different plants for practicing certain aspects of the present disclosure, in accordance with various implementations.

FIG. 3 illustrates example crop trajectories visualized for practicing certain aspects of the present disclosure, in accordance with various implementations. The crop trajectories shown in FIG. 3 can include a crop trajectory for a first crop (e.g., strawberry plant) on different stages of growth. For example, the crop trajectory for the strawberry plant may include a first crop trajectory portion 301 corresponding to a first growth stage of the strawberry plant, and a second crop trajectory portion 303 corresponding to a second growth stage of the strawberry plant. As a non-limiting example, the first growth stage is an early growth stage (e.g., "sprout"), and the second growth stage is a late growth stage (e.g., "fruit-bearing").

The first crop trajectory portion 301 may include a plurality of image embeddings, e.g., four image embeddings A1~A4. The second crop trajectory portion 303 may include a plurality of image embeddings, e.g., three image embeddings A'~A''''. In some implementations, the image embedding A1 may be obtained by processing a first image of the strawberry plant captured at $T_1$, the image embedding A2 may be obtained by processing a second image of the strawberry plant captured at $T_2$, the image embedding A3 may be obtained by processing a third image of the strawberry plant captured at $T_3$, and the image embedding A4 may be obtained by processing a fourth image of the strawberry plant captured at T4, where T1<T2<T3<T4. The first, second, third, and fourth images together form a temporal sequence of images representing the strawberry plant in the early growth stage.

Further, the image embedding A' may be obtained by processing a fifth image of the strawberry plant captured at T5, the image embedding A'' may be obtained by processing a sixth image of the strawberry plant captured at T6, the image embedding A''' may be obtained by processing a seventh image of the strawberry plant captured at T7, where T4<T5<T6<T7. The fifth, sixth, and seventh images together form a temporal sequence of images representing the strawberry plant in the late growth stage. In some implementations, the first to seventh images are individually processed using a trained CNN model to obtain a corresponding image embedding, and such image embeddings are visualized in the common 2D or 3D coordinate system via t-SNE.

In some implementations, the first crop (e.g. the strawberry plant) may remain in the same health condition ("C") throughout its life cycle, and its crop trajectory that includes the first crop trajectory portion 301 and the second crop trajectory portion 303 may have a post-processing label for storing the entire crop trajectory in a crop trajectory database as a reference crop trajectory. The post-processing label may be in a format configured using a template that includes a plurality of variables, e.g., [crop name and/or crop ID] [health condition C]_[one or more other variable(s)], where the crop name in the first bracket may be first crop (e.g., strawberry plant), the crop ID in the second bracket may be a numeric ID (e.g., #12345) or a combination of symbol(s), letter(s), and/or number(s) that is assigned by a user to the first crop, and the health condition C may be healthy, disease, dehydration or other conditions of the first crop, and the one or more other variables may include growth stage, crop field, etc. For example, the post-processing label of the first crop may be formatted as: "first crop_health condition X." It's noted that the orders of format of the post-processing label may be configured in any appropriate way to fit the need of indexing the crop trajectory database.

For example, in case of a strawberry plant staying healthy during its life cycle, the post-processing label can be "strawberry plant_healthy", or "strawberry plant_healthy in its entire life cycle". Such crop trajectory of the first crop may be stored, along with some of the previously discussed metadata, in a crop trajectory database, for future use as a reference crop trajectory to detect deviation and/or anomaly. In some implementations, the first crop (e.g. the strawberry plant) is healthy on the first growth stage but suffers a certain type of disease (e.g. *fusarium* wilt) on the second growth stage. In this case, the corresponding crop trajectory may have a post-processing label, for example, as "first crop healthy on first growth stage *fusarium* on second growth stage," and such labeled crop trajectory may be stored in the crop trajectory database, and be used as a reference crop trajectory for observation or detection of deviation and/or anomaly. Additionally or alternatively, the first crop trajectory portion 301 may individually have a post-processing label "first crop_healthy on the first growth stage," and the second crop trajectory portion 303 may individually have a post-processing label "first crop_fusarium on the second growth stage." The first crop trajectory portion 301 and the second crop trajectory portion 303 may be respectively stored in the crop trajectory database as reference crop trajectories, together with their post-processing labels.

Further, the crop trajectories shown in FIG. 3 can include a crop trajectory 305 for a second crop, and a crop trajectory 307 for a third crop. The second crop may be a bush bean plant as a companion plant of the strawberry plant, or any other type of crop in the field. The third crop may be, for example, an onion as an additional companion plant of the strawberry plant. The crop trajectory 305 may include a plurality of image embeddings that correspond to a temporal sequence of images captured for the second crop, where the temporal sequence of images are images captured throughout the life cycle of the second crop or captured within substantially the same growth stage of the second crop. The crop trajectory 307 may include a plurality of image embeddings that correspond to a temporal sequence of images captured from the third crop, where the temporal sequence of images is captured throughout the life cycle of the third crop (or is captured in substantially the same growth stage).

In some implementations, the temporal sequence of images captured for the second crop may witness the healthy growth of the second crop from a first age to a second age. The first age may be a first growth date X (e.g., counted from the burying of the seed of the second crop in the soil of the field to the time the first image in the temporal sequence is captured), and the second age is a second growth date Y (e.g., counted from the burying of the seed of the second crop in the soil of the field to the time the last image in the temporal sequence is captured). In this case, the crop trajectory of the second crop may be assigned a post-processing label of "second crop_healthy from day X to day Y" for storage in the crop trajectory database. Optionally, if images in the temporal sequence are all captured within the early growth stage of the second crop, the crop trajectory of the second crop may be assigned a post-processing label of "second crop_healthy in early growth stage" for storage in the crop trajectory database. The stored crop trajectory of the second crop may be used as a reference crop trajectory for comparison.

In some implementations, the temporal sequence of images captured for the third crop may witness the growth of the third crop from a first age to a second age, where the third crop has and remains to have the same leaf disease. The first age may be day X' (e.g., counted from the burying of the seed of the third crop in the soil of the field to the time the first image in the temporal sequence of images captured for the third crop is captured), and the second age is day Y' (e.g., counted from the burying of the seed of the third crop in the soil of the field to the time the last image in the temporal sequence is captured). In this case, the crop trajectory of the third crop may be assigned a post-processing label of "third crop_leaf disease from day X' to day Y'" for storage in the crop trajectory database as a reference crop trajectory. Optionally, if images in the temporal sequence of images captured for the third crop are all captured within the middle growth stage of the third crop, the crop trajectory of the second crop may be assigned a post-processing label of "third crop_leaf disease in late growth stage" for storage in the crop trajectory database. The stored crop trajectory of the third crop may be used as a reference crop trajectory for comparison.

Figure 4:
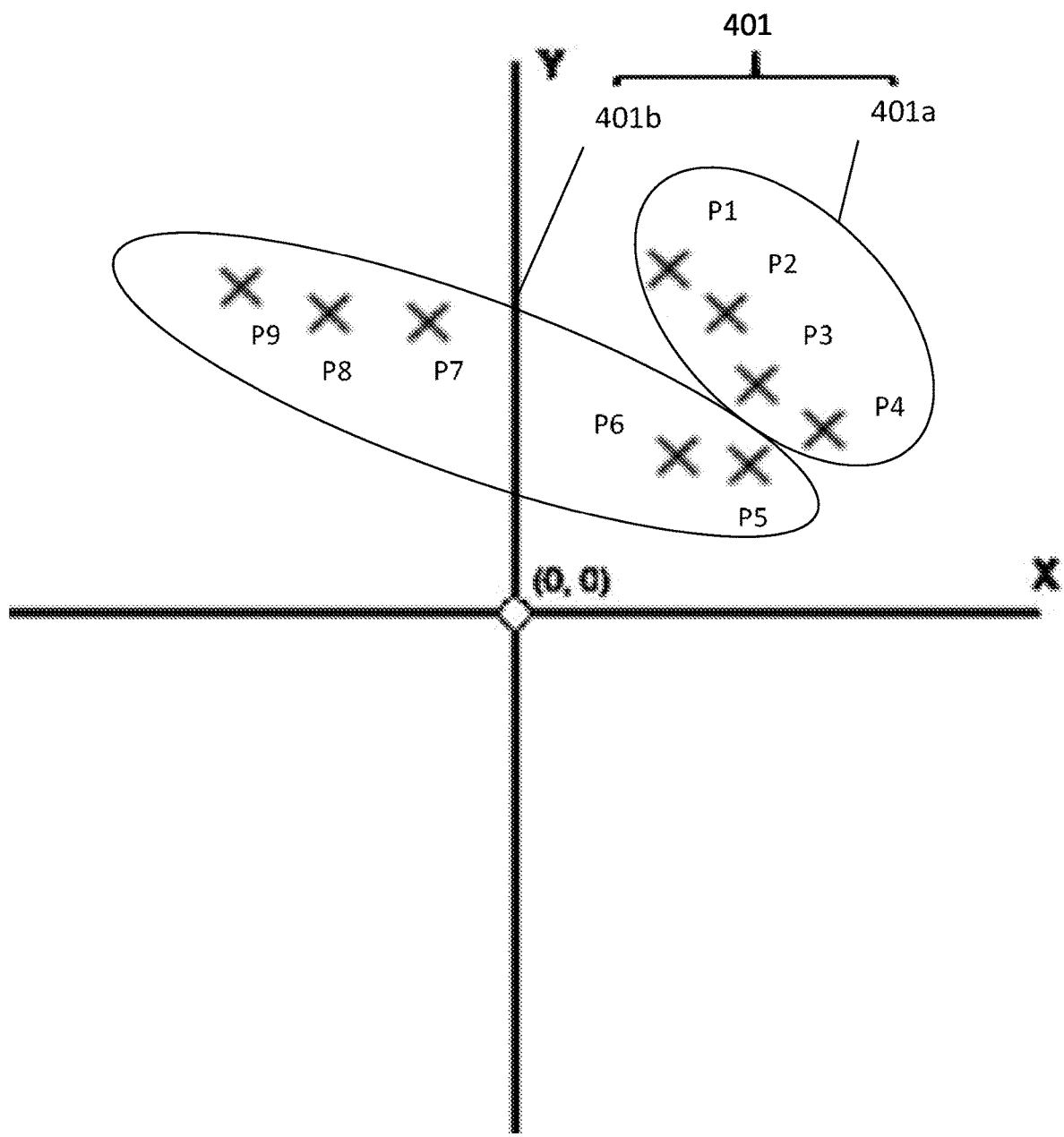
FIG. 4 illustrates an example crop trajectory for practicing certain aspects of the present disclosure, in accordance with various implementations.

FIG. 4 illustrates an example crop trajectory 401 for practicing certain aspects of the present disclosure, in accordance with various implementations. As shown in FIG. 4, the crop trajectory 401 includes a plurality of image embeddings P1~P9. These embeddings may be generated using one or more machine learning models described above, e.g., by processing a temporal sequence of crop-depicting images for crop M captured at times (or "ages") A1~A9. Crop M may be, for example, sugarbeet, soybeans, or any other type of crop. In some implementations, the temporal sequence of crop-depicting images for crop M can provide that crop M grows in a healthy condition between its age A1 and age A4; however, an abnormal condition is observed for crop M at age A5 and A6 (for example, leaves may begin to wilt in response to some stimulus). Further, the abnormal condition of crop M may be left unnoticed and deteriorates at age A7, age A8, and age A9. The ages A1~A9 may correspond to, for example, the days the crop M has lived since the time it is buried in the field as a seed.

The plurality of image embeddings P1~P9 may be used to observe the occurrence of an abnormal condition for crop M, so that the user can take proper remedial action. For example, referring to FIG. 4, image embeddings P5~P9 may reflect a sharp change in the arrangement trend with respect to image embeddings P1~P4. This may be readily found, for example, in a 2D coordinate system, by observing the crop trajectory 401 broken into two distinct regions: (1) a first portion 401a representing crop M between its age A1 and age A4; and (2) a second portion 401b representing crop M between its age A5 and age A9. In case that the output image embeddings are in N dimensions (N>3), the sharp change is not readily available for human observation, and in this case, the t-SNE algorithm can be applied to render the trajectories in two or three dimensions for observation by human eyes.

In some implementations, instead of human observation to identify the abnormal condition, one or more reference crop trajectories may be retrieved from the crop trajectory database for comparison with the crop trajectory output by a machine learning model (e.g., CNN) to evaluate a deviation. For example, the computing system may be configured to compare the crop trajectory of a to-be-studied crop with a primary reference crop trajectory that represents a healthy crop (in the same type as the to-be-studied crop) remaining healthy throughout its life cycle. In the case of crop M (crop ID: M-00108), the computing system may compare its crop trajectory 401 with a primary reference crop trajectory (labeled as representing a healthy crop having, for example, a crop ID of M-00001, that is of the same type as crop M and remains healthy during an entire life cycle, not shown in FIG. 4), and detect a deviation therefrom. The extent of the deviation may be evaluated by calculating a distance between the crop trajectory 401 and the primary reference crop trajectory. The distance may be an average distance, or include a plurality of characteristic distances, or calculated otherwise. Based on the deviation (e.g., the plurality of characteristic distances), the computing system may notify the user the date crop M starts to appear in an abnormal condition. Optionally, the computing system may further compare the crop trajectory 401 with one or more secondary reference crop trajectories (labeled in the crop trajectory database as representing the same type of crop having different health conditions at different growth stages), to determine the health condition and/or growth stages of crop M represented by the crop trajectory 401.

Figure 6:
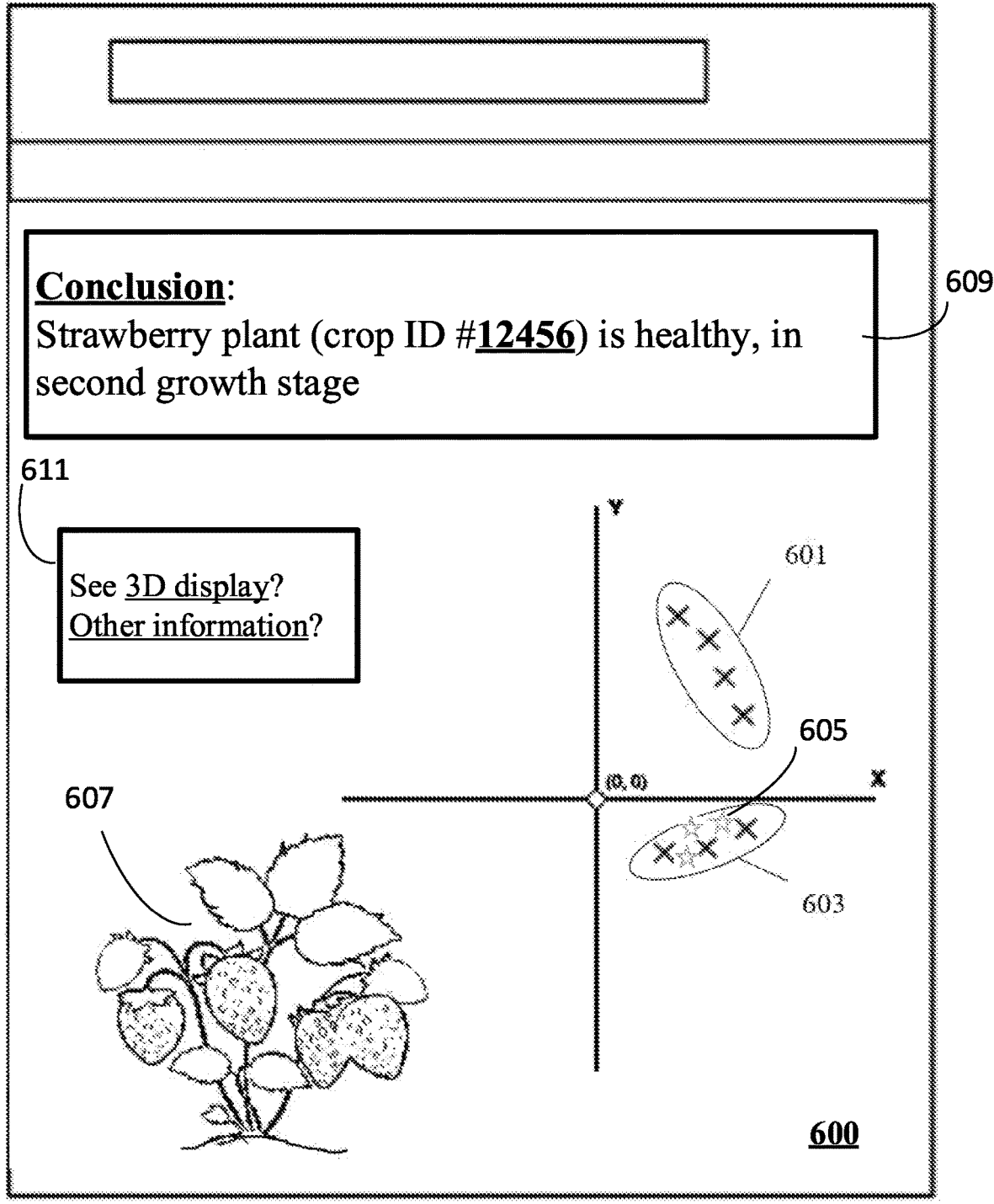
FIG. 6 illustrates an example user interface for practicing certain aspects of the present disclosure, in accordance with various implementations.
Figure 7:
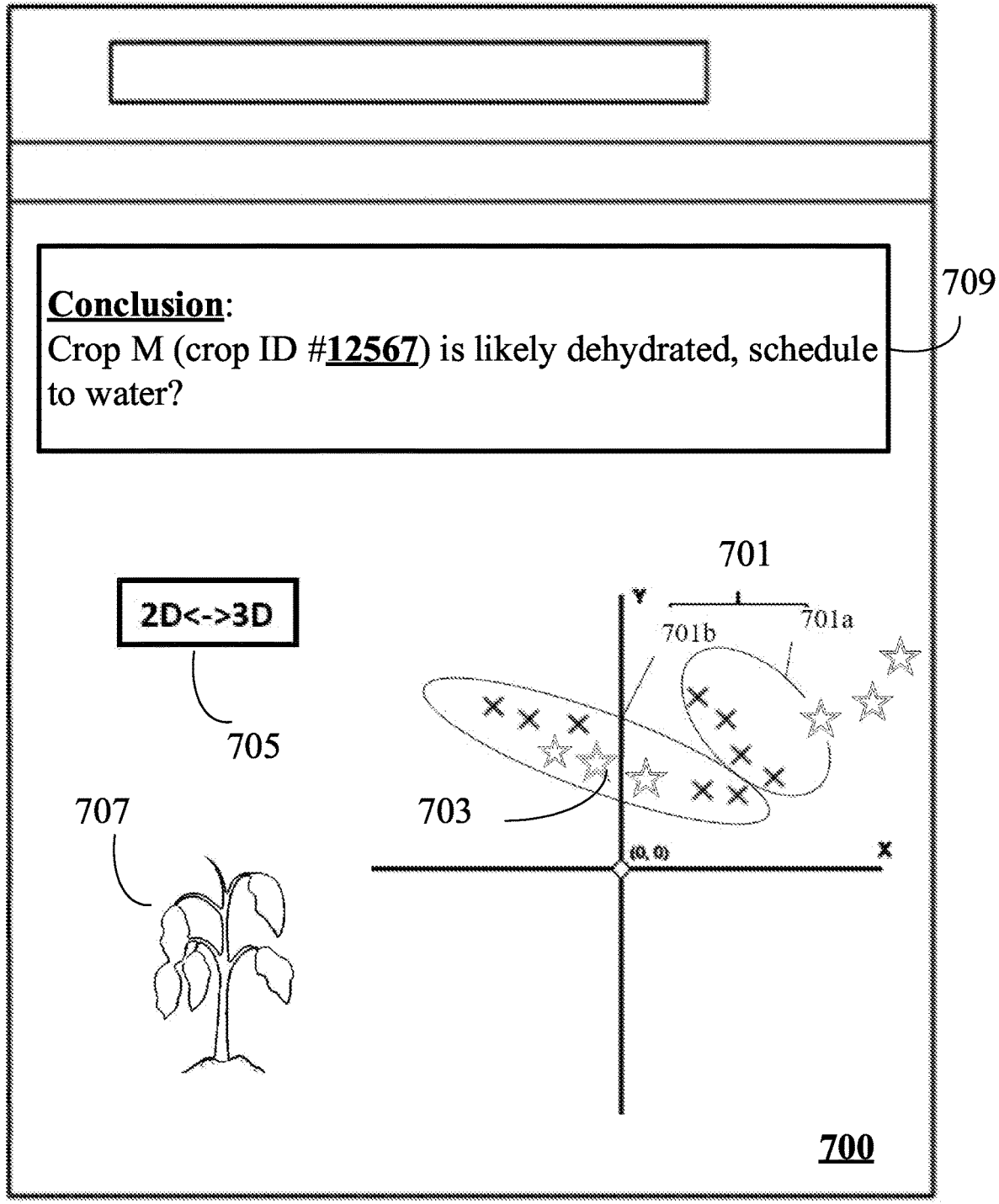
FIG. 7 illustrates another example user interface for practicing certain aspects of the present disclosure, in accordance with various implementations.

FIG. 8 illustrates an example method 800 for generating a crop trajectory of image embeddings, for practicing certain aspects of the present disclosure, in accordance with various implementations. FIG. 6 illustrates an example user interface for practicing implementations described in FIG. 8, and FIG. 7 illustrates another example user interface for practicing implementations described in FIG. 8.

As shown in FIG. 8, the method 800 includes, at block 801, processing a temporal sequence of images depicting a growth of a crop over a time interval using a machine learning model. The machine learning model can be, for example, a CNN or RNN. The temporal sequence of images depicting the growth of the crop may be collected by one or more vision sensors that are transported over/through a field of different crops or plants. The one or more vision sensors may be included in an image-capturing device transported in various ways, such as via a robot, rover, or unmanned aerial vehicle (UAV), or may be transported as standalone modular sensor packages that can be mounted to agricultural vehicles such as tractors or center pivots or carried by agricultural personnel. In some implementations, the one or more vision sensors are configured to capture high-resolution images, such as colored images having 2048×2592 pixels. In some implementations, the one or more vision sensors are configured to time stamp the captured images to generate the aforementioned temporal sequence of images.

The image-capturing device may include one or more processors for receiving from and/or transmitting to, a computing system such as a local or remote server, metadata including crop ID, crop name, crop age, and field ID, etc. Additionally or alternatively, the image-capturing device may include one or more additional sensors to collect environmental data such as temperature, humidity, sunlight, local weather, and GPS coordinates. The one or more processors in the image-capturing device may be configured to time stamp the collected environmental data and/or the captured images, or the one or more additional sensors may time stamp the collected environmental data, before transmitting the environmental data to the local or remote server for further processing or storage.

The method 800 further includes, at block 803, based on the processing, generating a crop trajectory of image embeddings that represent the growth of the crop over the time interval. The generated crop trajectory of image embeddings may include a plurality of N-dimensional image vectors, where N is a positive integer greater than or equal to 1. For example, referring to FIG. 6, a crop trajectory of three image embeddings 605 (represented by the star symbol) is obtained for a to-be-evaluated strawberry plant. The three image embeddings 605 may correspond to a first image capturing the strawberry plant at t1, a second image capturing the strawberry plant at t2, and a third image capturing the strawberry plant at t3. For the crop trajectory showing three image embeddings 605 in FIGS. 6, t1, t2, and t3 are in relatively close proximity to each other. In some other implementations, t1, t2, and t3 can be any time point within the life cycle of the strawberry plant. Further, the first, second, and third images may be captured by the same image-capturing device or by different image-capturing devices, from substantially the same image-capturing angle or different image-capturing angle (e.g., side view and top view). Similarly, referring to FIG. 7, a crop trajectory of six image embeddings 703 can be obtained for crop M (e.g., sugarbeet, soybeans).

The method 800 further includes, at block 805, comparing the crop trajectory of image embeddings with one or more reference crop trajectories of image embeddings, where each of the one or more reference crop trajectories includes a plurality of image embeddings that represent the growth of a crop that is in the same type (classification) as the crop to which the crop trajectory of image embeddings correspond. For example, referring to FIG. 6, a crop trajectory of image embeddings 605 for the to-be-evaluated strawberry plant may be compared to reference crop trajectories 601 and 603, where the reference crop trajectory 601 corresponds to a first growth stage of a reference strawberry plant (e.g., an average strawberry plant or an usual strawberry plant) and the second crop trajectory portion 303 corresponds to a second growth stage of the reference strawberry plant.

In some implementations, the temporal sequence of the images used to generate the image embeddings 605 are not time stamped, neither manually nor automatically, so that the crop ages of the to-be-evaluated strawberry plant at the time the images are captured are unknown. In this case, a user may identify that the to-be-evaluated strawberry plant is in the second growth stage because all the three image embeddings 605 fall within a tolerance-allowable region associated with the reference crop trajectory 603. Further, if the reference strawberry plant is healthy in the second growth stage, the to-be-evaluated strawberry plant is determined to be healthy in the second growth stage. In some implementations, the temporal sequence of the images used to generate the image embeddings 605 are time stamped, and are compared to the reference crop trajectory 603 to determine whether the strawberry plant grows (or ripens) at a slower or faster rate than usual. For example, the reference crop trajectory 603 may include a first reference image embedding of the strawberry plant (i.e., the rightmost "X" in the reference crop trajectory 603 in FIG. 6) at Age 1, a second reference image embedding of the strawberry plant (i.e., the middle "X" in 603 of FIG. 6) at Age 2, and a third reference image embedding of the strawberry plant (i.e., the leftmost "X" in 603 of FIG. 6) at Age 3. If the three image embeddings 605 of the to-be-evaluated strawberry plant are processed from images captured on dates that respectively correspond to, or within a range of Age 1, Age 2, and Age 3, the to-be-evaluated strawberry plant can be determined to grow faster than usual in the second growth stage, alternatively or in additional to determining that the to-be-evaluated strawberry plant is in the second growth stage, based on comparing the crop trajectory of image embeddings 605 with the reference crop trajectory 603 to find the to-be-evaluated strawberry plant traverses at a higher speed in the embedding space (i.e., the common coordinate system) than the reference strawberry plant.

In some implementations, referring to FIG. 7, a crop trajectory of six image embeddings 703 for to-be-evaluated crop M (represented by the star symbol) is compared with a reference crop trajectory 701 of a reference crop M, where the leftmost three image embeddings 703 (star shapes) represent the latest three images captured from the to-be-evaluated crop M and the rightmost three image embeddings 703 (also star shapes) represent the earlier three images captured from the to-be-evaluated crop M. The reference crop trajectory 701 (each embedding represented by an "x") includes a first portion 701a and a second portion 701b. The first portion 701a may correspond to the crop M growing in a healthy condition during a first period of a given growth stage, and the second portion 701b corresponds to the crop M growing in an abnormal condition (e.g., leaf disease) during a second period of the given growth stage, where the second period is subsequent to the first period. Based on the comparison, it may be determined that the to-be-evaluated crop M is likely also experiencing substantially the same abnormal condition of the reference crop M during the second period of the given growth stage. It's further determined that the to-be-evaluated crop M may have been in this abnormal condition during the first period of the given growth stage.

In some implementations of the aforementioned method 800, the comparison includes performing regression analysis on the crop trajectory of image embeddings and one or more of the reference crop trajectories.

The method 800 further includes, at block 807, causing data associated with the comparison to be provided as output. In some implementations, the causing includes causing a display to simultaneously render the crop trajectory of image embeddings and one or more of the reference crop trajectories. In some implementations, causing the display to simultaneously render the trajectories includes implementing the t-SNE technique to render the trajectories in two or three dimensions. For example, referring to FIG. 6, the crop trajectory of image embeddings 605 for a to-be-evaluated strawberry plant and the reference crop trajectories 601 and 603 are displayed in a common coordinate system (e.g., 2D coordinate system) via a user interface 600 of a display, for readily comparison by the user.

In some implementations, the aforementioned method 800 further includes: generating one or more phenotypic conclusions about the growth of the crop based on the comparison, wherein the data associated with the comparing includes the one or more phenotypic conclusions. For example, referring to FIG. 6, an agricultural conclusion 609 may be displayed via the user interface 600. The agricultural conclusion 609 may include one or more of the following: whether the strawberry plant is healthy or encounters one or more specific abnormal conditions (e.g., disease, pest infestation, dehydration, overhydration, suboptimal nutrients, etc.), whether the strawberry plant grows (or ripens) at a slower or faster rate than usual, and an estimated target date (or date range) for the strawberry plant to bloom or harvest. For example, the agricultural conclusion 609 may, based on the comparing at block 805, state, "Strawberry plant (crop ID #12456) is healthy." In some implementations, the agricultural conclusion 609 may further include a current growth stage of the strawberry plant, and as shown in FIG. 6, the agricultural conclusion 609 may be "Strawberry plant (crop ID #12456) is healthy, in second growth stage." In some implementations, the agricultural conclusion 609 may include: "Strawberry plant (crop ID #12456) grows faster than usual". Optionally, a prompt 611 may be provided to the user via the user interface 600. For example, the prompt 611 may ask the user whether he or she wants to see the comparing of the crop trajectories in a 3D space (e.g., "See 3D display?"), and/or whether the user needs other information about the strawberry plant to be studied (e.g., "Other information?").

As another example, referring to FIG. 7, the crop trajectory of six image embeddings 703 for crop M (to be studied) and the reference crop trajectory 701 of the reference crop M are displayed in a common 2D coordinate system, and are presented to the user via a user interface 700, for visual comparison. In some implementations, an agricultural conclusion 709 may be displayed via the user interface 700. The agricultural conclusion 709 may include one or more of the following: an estimated target date (or date range) for crop M to bloom or harvest, whether the crop M is healthy or encounters one or more specific abnormal conditions (e.g., disease, pest infestation, dehydration, overhydration, suboptimal nutrients, etc.), or whether the crop M grows (or ripens) at a slower or faster rate than usual. For example, the agricultural conclusion 709 may be generated, based on the comparing at block 805, to state, "Crop M (crop ID #12567) is likely dehydrated, schedule to water?"

In some implementations, the agricultural conclusion 709 may further include a current growth stage of the crop M, for example, the agricultural conclusion 709 may be. "Crop M (crop ID #12567) is in its first growth stage and is likely dehydrated, schedule to water?" In some implementations, the agricultural conclusion 709 may include a predicted probability of dehydration, such as "Crop M (crop ID #12567) is dehydrated. Accuracy rate: 85%". The user interface 700 may further include a most recent crop-depicting image 707 of the crop M to be studied in response to the user clicks on the crop ID number (e.g., "12567" in FIG. 7), so that the user can more readily understand the health condition of the crop M to be studied and therefore taking proper actions. Optionally, a button 705 may be provided to the user via the user interface 700. For example, the button 705 enables the user to switch the comparison of the crop trajectories between a 3D space and a 2D space.

In some implementations, the generating one or more phenotypic conclusions about the growth of the crop based on the comparing includes: applying a classifier machine learning model to the crop trajectory of image embeddings to classify the crop to which the crop trajectory corresponds, wherein the classifier machine learning model is trained based at least in part based on the one or more reference trajectories. The classifier machine learning model may include a CNN or a RNN.

In some implementations, in the aforementioned method 800, the comparison includes identifying a deviation of the crop trajectory of image embeddings from one or more of the reference crop trajectories. For example, referring to FIG. 700, a right portion of the crop trajectory of six image embeddings 703 (of the crop M to be studied) is identified to deviate from the corresponding portion of the reference crop trajectory 701 (of the reference crop M). Given that the first portion 701a of the reference crop trajectory 701 corresponds to a healthy condition of the crop M to be studied, a user can reasonably suspect that the crop M to be studied is in an abnormal condition by readily looking at the comparison in a 2D or 3D space.

In some implementations, the deviation of crop trajectory of image embeddings from one or more of the reference crop trajectories may be determined quantitatively. For example, if the crop trajectory of image embeddings includes three image embeddings E1 ($a_1, a_2, a_3, \ldots, a_N$), E2 ($b_1, b_2, b_3, \ldots, b_N$), E3 ($c_1, c_2, c_3, \ldots, c_N$), and a reference crop trajectory include four image embeddings, among which, three correspond to E1, E2, and E3. Assume the corresponding image embeddings in the reference crop trajectory is R1 ($a_1'$, $a_2'$, $a_3'$ ..., $a_N'$), R2 ($b_1'$, $b_2'$, $b_3'$ ..., $b_N'$), R3 ($c_1'$, $c_2'$, $c_3'$, ..., $c_N'$), different mathematical calculations such as cosine similarity or Euclidean distance may be performed to determine the deviation. For example, the Euclidean distance between image embedding E1 and the corresponding R1 may be calculated using the equation:

$$d(a, a') = \sqrt{\sum_{i=1}^{N}(a_i - a_i')^2}.$$

FIG. 9 illustrates another example method 900 for generating a crop trajectory of image embeddings, for practicing certain aspects of the present disclosure, in accordance with various implementations. As shown in FIG. 9, the method 900 includes, at block 901: processing a temporal sequence of images depicting a growth of a crop over a time interval using a machine learning model. The method 900 further includes, at block 903: based on the processing, generating a crop trajectory of image embeddings that represent the growth of the crop over the time interval. The method 900 further includes, at block 905: accessing one or more reference crop trajectories of image embeddings, each of the one or more reference crop trajectories including a plurality of image embeddings that represent the growth of the crop in the same type as the crop to which the crop trajectory of image embeddings over a respective time interval corresponds. The method 900 further includes, at block 907: causing a display to simultaneously render the crop trajectory of image embeddings and one or more of the reference crop trajectories using the t-distributed stochastic neighbor embedding (t-SNE) technique.

Figure 10:
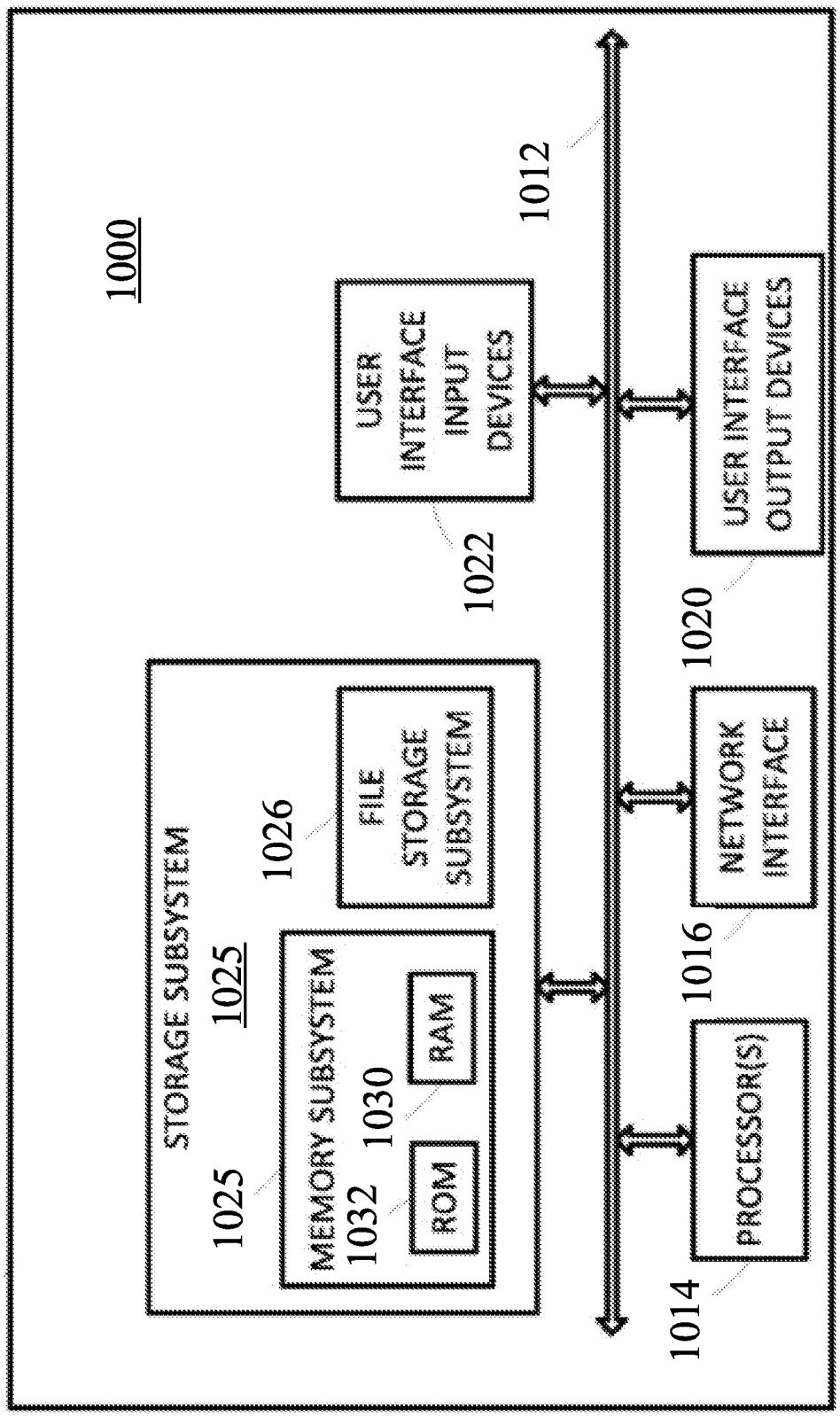
FIG. 10 illustrates an example architecture of a computing system, for practicing certain aspects of the present disclosure, in accordance with various implementations.

FIG. 10 illustrates an example architecture of a computing system 1000, for practicing certain aspects of the present disclosure, in accordance with various implementations. The computing system 1000 may be, for example, a server, that is utilized to perform one or more aspects of techniques described herein. Computing device 1000 typically includes at least one processor 1014 which communicates with a number of peripheral devices via bus subsystem 1012. These peripheral devices may include a storage subsystem 1024, including, for example, a memory subsystem 1025 and a file storage subsystem 1026, user interface output devices 1020, user interface input devices 1022, and a network interface subsystem 1016. The input and output devices allow user interaction with computing system 1000. Network interface subsystem 1016 provides an interface to outside networks and is coupled to corresponding interface devices in other computing devices.

User interface input devices 1022 may include a keyboard, pointing devices such as a mouse, trackball, touchpad, or graphics tablet, a scanner, a touch screen incorporated into the display, audio input devices such as voice recognition systems, microphones, and/or other types of input devices. In some implementations in which computing system 1000 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing system 1000 or onto a communication network.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing system 1000 to the user or to another machine or computing device.

Storage subsystem 1024 stores programming and data constructs that provide the functionality of some or all of the modules described herein. For example, the storage subsystem 1024 may include the logic to perform selected aspects of methods 800 and 900 described herein, as well as to implement various components depicted in FIG. 2.

These software modules are generally executed by processor 1014 alone or in combination with other processors. Memory 1025 used in the storage subsystem 1024 can include a number of memories including a main random-access memory (RAM) 1030 for storage of instructions and data during program execution and a read only memory (ROM) 1032 in which fixed instructions are stored. A file storage subsystem 1026 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1026 in the storage subsystem 1024, or in other machines accessible by the processor(s) 1014.

Bus subsystem 1012 provides a mechanism for letting the various components and subsystems of computing system 1000 communicate with each other as intended. Although bus subsystem 1012 is shown schematically as a single bus, alternative implementations of the bus subsystem may use multiple busses.

Computing system 1000 can be of varying types including a workstation, server, computing cluster, blade server, server farm, or any other data processing system or computing device. Due to the ever-changing nature of computers and networks, the description of computing system 1000 depicted in FIG. 10 is intended only as a specific example for purposes of illustrating some implementations. Many other configurations of computing system 1000 are possible having more or fewer components than the computing device depicted in FIG. 10.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, the method comprising:
   capturing, using an image capturing device of an agricultural robot travelling through a field, a temporal sequence of images depicting a growth of a crop in the field;
   processing, on the agricultural robot as it travels through the field, a temporal sequence of images depicting the growth of the crop in the field over a time interval using a machine learning model, the machine learning model:
     generating a crop trajectory of image embeddings that represent the growth of the crop over the time interval, the crop trajectory comprising at least a first stage trajectory representing a first growth stage of the crop in the field and a second stage trajectory representing a second growth stage of the crop in the field;
     comparing stages of the crop trajectory of image embeddings with stages of one or more reference crop trajectories of image embeddings to identify a trajectory deviation and a stage deviation between the crop trajectory and each of the one or more reference crop trajectories, wherein:
       each of the one or more reference crop trajectories includes a plurality of image embeddings that represent growth of a same type of crop as the crop trajectory of image embeddings over a respective time interval, and
       each reference crop trajectory comprises one or more stages representing the first growth stage and the second growth stage of the crop;
     identifying, based on the comparison and the identified stage deviation, a cause from a set of causes that induce the trajectory deviation between the crop trajectory and the one or more reference crop trajectories; and
   providing, to a client device remote from the agricultural robot, data associated with the identified cause for display on the client device.

2. The method of claim 1, wherein the causing includes causing a display to simultaneously render the crop trajectory of image embeddings and one or more of the reference crop trajectories.

3. The method of claim 2, wherein causing the display to simultaneously render the trajectories includes implementing a t-distributed stochastic neighbor embedding (t-SNE) technique to render the trajectories in two or three dimensions.

4. The method of claim 1, further comprising generating one or more phenotypic conclusions about the growth of the crop based on the comparing, wherein the data associated with the comparing includes the one or more phenotypic conclusions.

5. The method of claim 4, wherein the generating includes applying a classifier machine learning model to the crop trajectory of image embeddings, wherein the classifier machine learning model is trained based at least in part based on the one or more reference trajectories.

6. The method of claim 5, wherein the classifier machine learning model comprises a recurrent neural network.

7. The method of claim 1, wherein the comparing includes performing regression analysis on the crop trajectory of image embeddings and one or more of the reference crop trajectories.

8. The method of claim 1, further comprising:
   determining, based on the comparison of the identified stage deviation and the corresponding identified cause, an action to implement in the field to remedy the cause; and
   scheduling the action to implement the field by the agricultural robot.

9. The method of claim 1, further comprising:
   implementing, in the field by the agricultural robot, the action to remedy the identified cause.

10. The method of claim 1, wherein processing the temporal sequence of images depicting the growth of the crop in the field over the time interval using the machine learning model further comprises:
    providing, for display on the client device, a first visual representing the crop trajectory;
    providing, for display on the client device, a second visual representing the crop trajectory compared to reference crop trajectories;
    receiving, from the client device, a user input corresponding to the stage deviation; and
    wherein identifying the cause is additionally based on the user input.

11. The method of claim 1, wherein providing, for display on the client device, the first visual representing the crop trajectory and the second visual representing the crop trajectory compared to reference crop trajectory comprises applying on or more functions to the image embeddings to reduce their dimensionality for visualization on the client device.

12. A method implemented using one or more processors, the method comprising:
    accessing, from an image capturing device of an agricultural robot travelling through a field, a temporal sequence of images depicting a growth of a crop in the field;
    processing, on the agricultural robot as it travels through the field, a temporal sequence of images depicting the growth of the crop in the field over a time interval using a machine learning model, the machine learning model:
      generating a crop trajectory of image embeddings that represent the growth of the crop over the time interval, the crop trajectory comprising at least a first stage trajectory representing a first growth stage of the crop in the field and a second stage trajectory representing a second growth stage of the crop in the field;
      comparing stages of the crop trajectory of image embeddings with stages of one or more reference crop trajectories of image embeddings to identify a trajectory deviation and a stage deviation between the crop trajectory and each of the one or more reference crop trajectories, wherein:
        each of the one or more reference crop trajectories includes a plurality of image embeddings that represent growth of a same type of crop as the crop trajectory of image embeddings over a respective time interval, and
        each of the one or more reference crop trajectories includes a plurality of image embeddings that represent growth of a same type of crop as the crop trajectory of image embeddings over a respective time interval, and identifying, based on the comparison and the identified stage deviation, a cause from a set of causes that induce the trajectory deviation between the crop trajectory and the one or more reference crop trajectories; and causing a display to simultaneously render the crop trajectory of image embeddings, one or more of the reference crop trajectories, and the cause of the set of causes, the displayed reference crop trajectories and the crop trajectory of image embeddings illustrating the trajectory deviation.

13. The method of claim 12, wherein causing the display to simultaneously render the trajectories includes implementing a t-distributed stochastic neighbor embedding (t-SNE) technique or principal component analysis (PCA) to render the trajectories in two or three dimensions.

14. The method of claim 12, further comprising generating one or more phenotypic conclusions about the growth of the crop based on the identifying, wherein data associated with the identifying includes the one or more phenotypic conclusions.

15. The method of claim 14, wherein the generating includes applying a classifier machine learning model to the crop trajectory of image embeddings, wherein the classifier machine learning model is trained based at least in part based on the one or more reference trajectories.

16. The method of claim 15, wherein the classifier machine learning model comprises a recurrent neural network.

17. The method of claim 12, wherein the identifying includes performing regression analysis on the crop trajectory of image embeddings and one or more of the reference crop trajectories.

18. A system comprising one or more processors and memory storing instructions that, in response to execution of the instructions, cause the one or more processors to:

capture, using an image capturing device of an agricultural robot travelling through a field, a temporal sequence of images depicting a growth of a crop in the field;

process, on the agricultural robot, a temporal sequence of images depicting the growth of the crop in the field over a time interval using a machine learning model, the machine learning model:

generating a crop trajectory of image embeddings that represent the growth of the crop over the time interval, the crop trajectory comprising at least a first stage trajectory representing a first growth stage of the crop in the field and a second stage trajectory representing a second growth stage of the crop in the field;

comparing stages of the crop trajectory of image embeddings with stages of one or more reference crop trajectories of image embeddings to identify a trajectory deviation and a stage deviation between the crop trajectory and each of the one or more reference crop trajectories, wherein:

each of the one or more reference crop trajectories includes a plurality of image embeddings that represent growth of a same type of crop as the crop trajectory of image embeddings over a respective time interval, and each reference crop trajectory comprises one or more stages representing the first growth stage and the second growth stage of the crop;

identifying, based on the comparison and the identified stage deviation, a cause from a set of causes that induce the trajectory deviation between the crop trajectory and the one or more reference crop trajectories; and provide, to a client device remote from the agricultural robot, data associated with the identified cause for display on the client device.

19. The system of claim 18, wherein the instructions include instructions to implement a t-distributed stochastic neighbor embedding (t-SNE) technique to render the trajectories in two or three dimensions.

20. The system of claim 18, wherein the instructions include instructions to generate one or more phenotypic conclusions about the growth of the crop based on the comparing, wherein the data associated with the comparing includes the one or more phenotypic conclusions.

* * * * *